US008689316B2

(12) United States Patent
Mao et al.

(10) Patent No.: US 8,689,316 B2
(45) Date of Patent: *Apr. 1, 2014

(54) ROUTING A PACKET BY A DEVICE

(75) Inventors: Yu Ming Mao, Milpitas, CA (US);
Roger Jia-Jyi Lian, San Jose, CA (US);
Guangsong Huang, Sunnyvale, CA
(US); Lee Chik Cheung, San Jose, CA
(US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,780

(22) Filed: Sep. 14, 2012

(65) Prior Publication Data

US 2013/0007839 A1    Jan. 3, 2013

Related U.S. Application Data

(63) Continuation of application No. 12/832,347, filed on Jul. 8, 2010, now Pat. No. 8,291,114, which is a continuation of application No. 11/869,287, filed on Oct. 9, 2007, now Pat. No. 7,779,459, which is a continuation of application No. 09/967,878, filed on Sep. 28, 2001, now Pat. No. 7,302,700.

(51) Int. Cl.
*H04L 12/56*    (2011.01)
*G06F 15/163*    (2006.01)

(52) U.S. Cl.
USPC ............. 726/13; 709/232; 709/238; 370/351; 726/1

(58) Field of Classification Search
USPC .................. 370/351; 709/232, 238; 726/1, 13
See application file for complete search history.

(56) References Cited

U.S. PATENT DOCUMENTS

| 5,485,455 | A |   | 1/1996  | Dobbins et al. |
|-----------|---|---|---------|----------------|
| 5,491,694 | A |   | 2/1996  | Oliver et al.  |
| 5,521,910 | A |   | 5/1996  | Matthews       |
| 5,544,322 | A |   | 8/1996  | Cheng et al.   |
| 5,608,726 | A | * | 3/1997  | Virgile .......................... 370/401 |
| 5,684,800 | A |   | 11/1997 | Dobbins et al. |
| 5,708,654 | A |   | 1/1998  | Arndt et al.   |
| 5,781,550 | A |   | 7/1998  | Templin et al. |

(Continued)

FOREIGN PATENT DOCUMENTS

| EP | 1 164 755 A2     |   | 12/2001 |
|----|------------------|---|---------|
| JP | 06-311161        |   | 11/1994 |
| JP | 2005215935 A     | * | 8/2005  |
| WO | WO 95/35610      |   | 12/1995 |

OTHER PUBLICATIONS

Partial European Search Report corresponding to EP 07 76 3764, mailed Nov. 15, 2010, 4 pages.

(Continued)

*Primary Examiner* — Beemnet Dada
*Assistant Examiner* — Kalish Bell
(74) *Attorney, Agent, or Firm* — Harrity & Harrity, LLP

(57) ABSTRACT

Methods and apparatus for transferring packets in a packet switched communication system. A system is provided that includes an L2 device including a controller determining for each packet received whether the received packet is to be inspected, an inspection device operable to inspect and filter packets identified by the controller including using a zone specific policy and an L2 controller for transferring inspected packets in accordance with L2 header information using L2 protocols.

20 Claims, 5 Drawing Sheets

(56) References Cited

U.S. PATENT DOCUMENTS

| | | | |
|---|---|---|---|
| 5,790,546 A | 8/1998 | Dobbins et al. | |
| 5,842,040 A | 11/1998 | Hughes et al. | |
| 5,889,953 A | 3/1999 | Thebaut et al. | |
| 5,905,859 A | 5/1999 | Holloway et al. | |
| 5,909,686 A | 6/1999 | Muller et al. | |
| 5,918,018 A | 6/1999 | Gooderum et al. | |
| 5,946,308 A | 8/1999 | Dobbins et al. | |
| 5,968,176 A | 10/1999 | Nessett et al. | |
| 6,000,045 A | 12/1999 | Lewis | |
| 6,041,058 A | 3/2000 | Flanders et al. | |
| 6,049,528 A | 4/2000 | Hendel et al. | |
| 6,088,356 A | 7/2000 | Hendel et al. | |
| 6,098,172 A | 8/2000 | Coss et al. | |
| 6,101,170 A | 8/2000 | Doherty et al. | |
| 6,115,472 A | 9/2000 | Shimizu et al. | |
| 6,131,120 A | 10/2000 | Reid | |
| 6,141,749 A | 10/2000 | Coss et al. | |
| 6,141,755 A | 10/2000 | Dowd et al. | |
| 6,147,995 A * | 11/2000 | Dobbins et al. | 370/392 |
| 6,154,775 A | 11/2000 | Coss et al. | |
| 6,170,012 B1 | 1/2001 | Coss et al. | |
| 6,172,981 B1 | 1/2001 | Cox et al. | |
| 6,182,226 B1 | 1/2001 | Reid et al. | |
| 6,212,558 B1 | 4/2001 | Antur et al. | |
| 6,219,707 B1 | 4/2001 | Gooderum et al. | |
| 6,233,688 B1 | 5/2001 | Montenegro | |
| 6,301,257 B1 | 10/2001 | Johnson et al. | |
| 6,304,973 B1 | 10/2001 | Williams | |
| 6,438,133 B1 | 8/2002 | Ervin et al. | |
| 6,456,597 B1 | 9/2002 | Bare | |
| 6,457,059 B1 | 9/2002 | Kobayashi | |
| 6,591,303 B1 | 7/2003 | Hendel et al. | |
| 6,606,315 B1 | 8/2003 | Albert et al. | |
| 6,633,560 B1 | 10/2003 | Albert et al. | |
| 6,650,641 B1 | 11/2003 | Albert et al. | |
| 6,684,253 B1 | 1/2004 | Whitaker et al. | |
| 6,704,278 B1 | 3/2004 | Albert et al. | |
| 6,735,169 B1 | 5/2004 | Albert et al. | |
| 6,742,045 B1 | 5/2004 | Albert et al. | |
| 6,754,716 B1 | 6/2004 | Sharma et al. | |
| 6,763,469 B1 | 7/2004 | Daniely | |
| 6,775,692 B1 | 8/2004 | Albert et al. | |
| 6,961,771 B2 | 11/2005 | Sato | |
| 7,032,037 B2 | 4/2006 | Garnett et al. | |
| 7,042,870 B1 | 5/2006 | Albert et al. | |
| 7,047,561 B1 | 5/2006 | Lee | |
| 7,051,066 B1 | 5/2006 | Albert et al. | |
| 7,103,055 B2 | 9/2006 | Kadambi et al. | |
| 7,143,438 B1 * | 11/2006 | Coss et al. | 726/11 |
| 7,302,700 B2 | 11/2007 | Mao et al. | |
| 7,346,686 B2 | 3/2008 | Albert et al. | |
| 7,535,907 B2 | 5/2009 | Hussain et al. | |
| 7,643,481 B2 | 1/2010 | Kadambi et al. | |
| 7,778,254 B2 | 8/2010 | Kadambi et al. | |
| 7,779,459 B2 | 8/2010 | Mao et al. | |
| 7,895,431 B2 | 2/2011 | Bouchard et al. | |
| 8,023,413 B2 | 9/2011 | Kadambi et al. | |
| 8,291,114 B2 | 10/2012 | Mao et al. | |
| 2001/0042213 A1 | 11/2001 | Jemes et al. | |
| 2002/0053020 A1 | 5/2002 | Teijido et al. | |
| 2003/0041171 A1 | 2/2003 | Kobayashi | |
| 2003/0048779 A1 | 3/2003 | Doherty et al. | |
| 2003/0179707 A1 | 9/2003 | Bare | |

OTHER PUBLICATIONS

Julkunen et al., "Enhance Network Security with Dynamic Packet Filter", IEEE (1998), pp. 268-275.

Sharp et al., "Starburst: Building Next-Generation Internet Devices", Bell Labs Technical Journal 6 (2), pp. 6-17 (2002).

* cited by examiner

ROUTING A PACKET BY A DEVICE

RELATED APPLICATIONS

This application is a continuation of U.S. patent application Ser. No. 12/832,347 filed on Jul. 8, 2010, which is a continuation of U.S. patent application Ser. No. 11/869,287, filed Oct. 8, 2007 (now U.S. Pat. No. 7,779,459), which is a continuation of U.S. patent application Ser. No. 09/967,878 filed Sep. 28, 2001 (now U.S. Pat. No. 7,302,700), the disclosures of which are incorporated herein by reference.

BACKGROUND

The present invention relates generally to data routing systems, and more particularly to methods and apparatus for providing secure communications on a network.

A packet switch communication system includes a network of one or more switches or routers connecting a plurality of users. A packet is the fundamental unit of transfer in the packet switch communication system. A user can be an individual user terminal or another network.

A layer 2 (L2) switch is a switching device which receives packets containing data or control information on one port, and based on a media access connection (MAC) address contained within the packet, switches the packet out another port. Conventional L2 switches perform this switching function by evaluating layer 2 (L2) header information contained within the packet in order to determine the proper output port for a particular packet. The L2 switch includes a table that maps MAC addresses with output ports. If a MAC address is unknown (i.e., there is no corresponding entry in the table), then the corresponding packet is broadcast to all output ports with the hope that another component in the packet switched communication system will recognize the MAC address (and pass back information to the forwarding L2 switch to update its table). Other types of L2 devices include bridges.

A router is a switching device which receives packets containing data or control information on one port, and based on destination information contained within the packet, routes the packet to a next hop to/toward the destination. Conventional routers perform this switching function by evaluating layer 3 (L3) header information contained within the packet in order to determine a next hop for a particular packet. The layer 3 information includes an IP address associated with the intended destination (as well as source address) for the packet.

The network coupling the users can be an intranet, that is, a network connecting one or more private servers such as a local area network (LAN). Alternatively, the network can be a public network, such as the Internet, in which data packets are passed over untrusted communication links. The network configuration can include a combination of public and private networks. For example, two or more LAN's with individual terminals can be coupled together using a public network such as the Internet. Data security issues can arise when public and private networks are linked or when distinct networks are coupled. For example, conventional packet switched communication systems that include links between public and private networks typically include security measures for assuring network access control and data integrity.

In order to assure individual packet security, packet switched communication systems can include encryption/decryption services. Prior to leaving a trusted network (or portion of a network), individual packets can be encrypted to minimize the possibility of data loss while the packet is transferred over an untrusted (e.g., public) network (or portion thereof). Upon receipt at a destination or another trusted portion of the communication system (e.g., at a firewall just before the destination), the packet can be decrypted and subsequently delivered to its intended destination. The use of encryption and decryption allows for the creation of a virtual private network (VPN) between users separated by untrusted communication links.

In addition to security concerns for the data transferred over the public portion of the communications system, the private portions of the network must safeguard against intrusions through the gateway provided at the interface of the private and the public networks. A firewall is a device that can be coupled in-line between a public network and private network for screening packets received from the public network. A firewall is a particular type of L3/L4 device that can be used to enforce policy and filtering functions. A firewall can include one or more engines for inspecting, filtering, authenticating, encrypting, decrypting and otherwise manipulating received packets. Conventional firewalls use L3 and L4 header information including IP addresses associated with the source and destination of a given packet being processed. Received packets are inspected and thereafter forwarded or dropped in accordance with the policies associated with the given domain.

SUMMARY

In one aspect, the invention provides an L2 device in a packet switched communication system. The packet switched communication system has plural zones and each zone represents a distinct security domain and has an associated policy for use in inspecting packets entering/exiting an associated zone. The L2 device includes at least one port coupled to a terminal unit included in a first security zone, at least one port coupled to a terminal unit included in a second security zone, a controller determining for each packet received whether the received packet is destined for another zone, a firewall engine operable to inspect and filter inter-zone packets using a zone specific policy and an L2 switching engine. The L2 switching engine is operable to immediately route to a port all intra-zone packets passing through the L2 device using a table of MAC addresses and corresponding ports, and only route to a port inter-zone packets that are retained after the inspection by the firewall engine.

In another aspect, the invention provides an L2 device in a packet switched communication system. The L2 device includes a controller determining for each packet received whether the received packet is to be transferred intra-zone or inter-zone, a firewall engine operable to inspect and filter inter-zone packets using a zone specific policy and an L2 switching engine operable to immediately route to a port all intra-zone packets passing through the L2 device using a table of MAC addresses and corresponding ports and only route to a port inter-zone packets that are retained after the inspection by the firewall engine.

In another aspect, the invention provides an L2 device in a packet switched communication system including a controller determining for each packet received whether the received packet is to be transferred inter-zone and a firewall engine operable to inspect and filter inter-zone packets using a zone specific policy prior to routing using L2 protocols.

In another aspect, the invention provides an L2 device in a packet switched communication system including a controller determining for each packet received whether the received packet is to be transferred inter-zone and an inspection device operable to inspect and filter inter-zone packets using a zone specific policy prior to routing using L2 protocols.

In another aspect, the invention provides an L2 device in a packet switched communication system including a controller determining for each packet received whether the received packet is to be inspected, an inspection device operable to inspect and filter packets identified by the controller including using a zone specific policy and an L2 controller for transferring inspected packets in accordance with L2 header information using L2 protocols.

Aspects of the invention can include one or more of the following features. The inspection device can be a firewall including a layer 3 firewall device, a layer 4 firewall device and a layer 7 firewall device. The inspection device can be a firewall that filters based on layer information other than layer 2 header information. The controller can determine each packet that is to pass between security zones and the inspection device only processes inter-zone traffic. The controller can determine each packet that is to remain in a single security zone and the inspection device immediately routes intra-zone packets. The device can route traffic using the MAC address in the layer 2 header of a given packet to determine an egress port on the device to which the packet is to be routed.

The device can include a storage element for storing packets that are to be inspected and an L2 controller for transferring packets through the device including determining an egress port for transferring a given packet using a destination MAC address in the given packet and a MAC address table that includes a mapping of MAC addresses and associated egress nodes. The memory element can include a first and second portion. The first portion can store packets to be transferred through the device and the second portion can store packets waiting for inspection. The device can be a L2 switch or an L2 bridge.

In another aspect, the invention provides a method for transferring packets in a communication network including receiving a packet at an L2 device, determining whether the received packet is to be transferred inter-zone and inspecting and filtering inter-zone packets using a zone specific policy prior to routing using L2 protocols.

In another aspect, the invention provides a method for transferring packets in a communication network including receiving a packet at an L2 device, determining whether the received packet is to be inspected and inspecting and filtering identified packets using a zone specific policy prior to transferring the packet through the L2 device using L2 protocols.

In another aspect, the invention provides a method for switching packets in a communication network including receiving a packet at an interface of an L2 device, determining if a destination MAC address associated with the received packet is known and, if not, holding the received packet a predetermined amount of time without transferring the packet to any port of the L2 device, creating a probe packet that includes the unknown MAC address and broadcasting the probe packet to all interfaces except the receiving interface.

Aspects of the invention can include one or more of the following features. The probe packet can include a time to life (TTL) field in a IP header and the method can include setting a value of the TTL field such that a downstream node having the unknown MAC address and receiving the probe cell will return an expired message to the L2 device. The method can include dropping the packet after the expiration of the predetermined amount of time. The packet can be dropped if the MAC address is unknown. The method can include receiving a response from on one of the broadcast interfaces and updating a table indicating a previously unknown MAC address is associated with the responding interface.

In another aspect, the invention provides method of providing secure communications between users without requiring encryption and decryption services at a respective user. The method includes identifying first and second users, coupling the first and second users through two or more L2 devices over a communication network and specifying a virtual private network for communications between the first and second users. The virtual private network is defined between a first and second L2 device in the network. The method includes receiving a packet at either the first or the second L2 device, determining whether the received packet is associated with the virtual private network and encrypting and decrypting as appropriate identified packets using local encryption and decryption services prior to transferring the packet through the L2 device using L2 protocols.

Aspects of the invention can include one or more of the following features. The step of determining can include using a destination MAC address associated with the packet to identify a virtual private network.

In another aspect, the invention provides a virtual private network for providing secure communications between users without requiring encryption and decryption services at a respective user. The virtual private network includes first and second L2 devices coupling first and second users over a communication network where each of the first and second L2 devices includes a screening mechanism determining whether a received packet is associated with the virtual private network and encryption and decryption services operating on packets associated with the virtual private network prior to a transfer of the packet through the L2 device using L2 protocols.

Aspects of the invention can include one or more of the following advantages. A packet switched communication system is provided that allows for the creation of plural security zones within a single device without requiring changes to the network or terminal configuration. Between each zone, a terminal unit can communicate with other terminal units without the knowledge of, yet receiving the benefits of, L2 switching and up to layer 7 security filtering as discussed below. A packet switched communication system is provided that includes L2 switch and firewall functionality. The packet switched communication system acts as an IEEE 802.1Q VLAN L2 conventional switch forwarding/filtering based on MAC-address for all intra-zone communications. The packet switched communication system allows L2 switching among multiple ports inside a given security zone. The L2 switch also provides up to layer 7 security firewall protections as appropriate for inter-zone or intra-zone traffic including TCP stateful inspection, syn-attack guard, policy-based control, load balancing and other functionalities on each data stream. In one implementation, the packet switched communication system can be configured to include multiple IEEE 802.1Q VLAN based L2 transparent domains. A user can create multiple VLANs, each having its own policy for firewall control. In addition, methods are provided for VPN tunnel capability to connect remote clients to the L2 domain. Methods are provided to guard against broadcasting information throughout the zones and violating one or more security constraints when a MAC address that is being processed is not recognized. The methods include the broadcast of probe packets to discover topology information for unknown MAC destinations.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a flow diagram of a method for processing packets in the security switch of FIG. 2a.

FIG. 4 is a flow diagram for a method for processing un-recognized packets in the security switch of FIG. 2a.

Like reference symbols in the various drawings indicate like elements.

DETAILED DESCRIPTION

Figure 1:
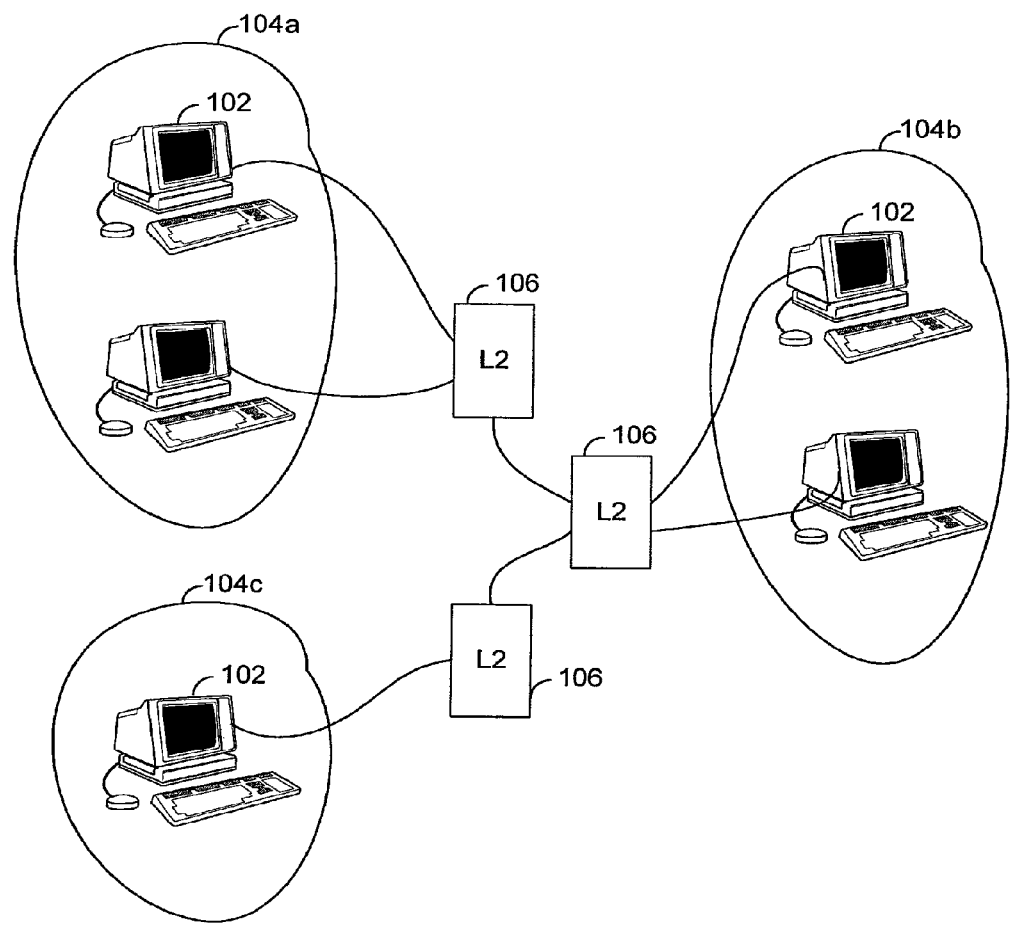
FIG. 1 is a block diagram of a packet switched communication system including an L2 firewall enabled switch.

Referring now to FIG. 1, a packet switch communication network 100 includes a plurality of terminal units 102 configured in a plurality of zones 104 and coupled by one or more switches 106.

In one implementation, each terminal unit 102 is of the form of a standalone computer (e.g., a personal computer, a laptop or workstation). Alternatively, one or more terminal units may be of the form of a personal digital assistant (PDA), Web pad, two-way pager, cellular handset, or other termination or remote device in a communication or computing environment. In one implementation, each terminal is a gateway to another network or group of terminal units (e.g., to a LAN or a pool of servers).

Each zone 104 embodies a security domain in the communication system. Each security domain can include separate policy, traffic management, accounting and administrative definitions and functions. Security policies, traffic management and other filtering functions can be enforced among and within zones. In one implementation, security policies are enforced between zones, while intra-zone communications are not subject to the security constraints. In one implementation, zones overlap. When zones overlap, policies associated with a parent zone can be a superset of the policies associated with one or more sub-zones (each including a subset of the overall policies). Alternatively, the policies associated with the parent zone may be separate and distinct from the policies of each sub-zone. For example, in one implementation, a zone can include one or more sub-zones, each including a separate set of policies.

In one implementation, each zone is associated with physical boundaries or other segmentation in the communication network. Alternatively, the assignment of particular terminal units to zones may represent groupings or combinations in a business structure (e.g., zones used to separate different functional entities in a business organization). Alternatively, the zones have no particular relation to physical boundaries. Communication between terminal units in each zone and among terminal units within a zone are controlled in accordance with protocols described below in association with switch 106.

Switch 106 may be of different types. In one implementation, each switch 106 is configured as a layer 2 (L2) device and includes a plurality of ports on which packets from the communication network are received and transferred in accordance with L2 protocols. Each switch 106 includes a media access connection (MAC) table for use in determining switching of received packets. The MAC table associates MAC addresses with ports of the switch 106. Packets are processed as they arrive at the ports of each switch 106 in accordance with L2 header information contained within a given packet. Depending on the MAC address, packets are switched to an appropriate output port as specified in the MAC table.

Figure 2A:
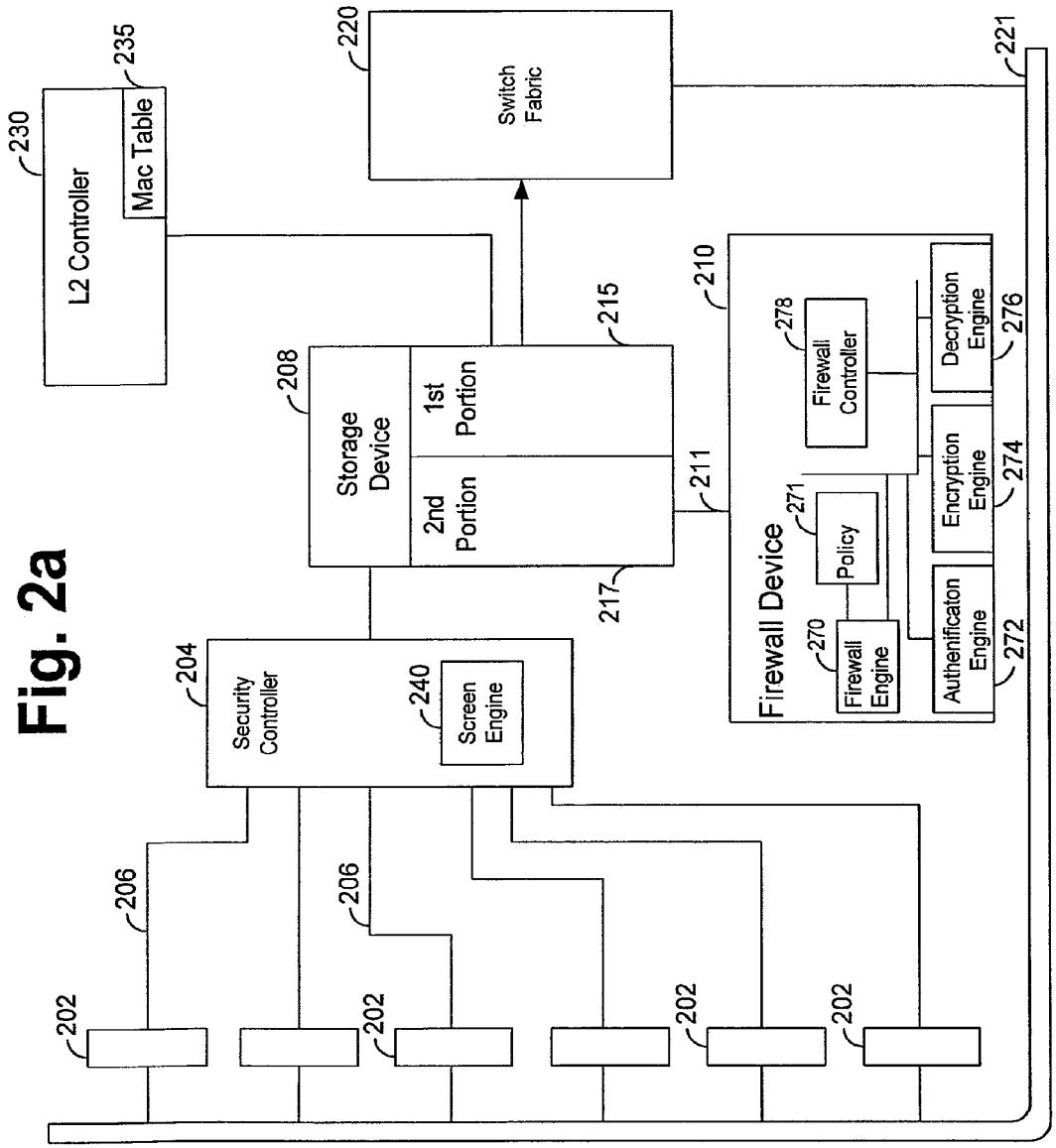
FIG. 2a is a schematic view of an L2 firewall enabled switch.

One or more of switches 106 are configured to enforce security domain constraints. For example, one or more of switches 106 is configured as an L2 firewall enabled security switch (hereinafter "security switch"). Referring now to FIG. 2, a security switch 200 includes a plurality of ports 202, a switch fabric 220 and an L2 controller 230. Each port 202 is coupled to a security controller 204 by a bus 206. The security controller 204 is coupled to one or more storage elements 208. In one implementation (not shown), each port 202 is associated with a separate security controller 204 and storage element 208. Alternatively, the security controller functionality can be combined in a single (as shown) or lesser number of individual security controller units. In addition, packets associated with all ports 202 can be stored in a single memory element 208 (as shown). Security switch 200 also includes a firewall device 210 that is coupled to (each) storage element 208 by a security bus 211.

L2 controller 230 supports L2 switching protocols. Packets are either directly processed (e.g., intra-zone packets) or processed after a security screening (e.g., for inter-zone packets) as discussed in greater detail below. Associated with L2 controller 230 is a MAC table 235. MAC table 235 includes plural entries each of which includes a MAC address and an indicator of a port 202 associated therewith. Switch fabric 220 is used to route traffic from storage element 208 to a respective port 202 under the control of L2 controller 230 using bus 221.

Storage element 208 is partitioned into two portions. A first portion 215 is used to store packets received from a port 202 that are not subject to security screening. For example, in one implementation, packets received from a terminal unit in a same security zone (e.g., intra-zone traffic) are not subject to security screening. Un-screened packets are processed directly by L2 controller 230 and forwarded out a designated port in accordance with L2 protocols as specified in MAC table 235. Second portion 217 is used to store packets to be screened by firewall device 210.

Security controller 204 includes a screening engine 240. Screening engine 240 examines each packet received from a respective port 202 and determines whether security screening is to be performed. In one implementation, screening engine 240 examines the L2 header for each packet, and based on the screening, either forwards the packet to the first or second portion 215 and 217, respectively, of storage element 208. The L2 header includes a destination MAC address that can be mapped to an egress port on the device using the MAC table 235. Associated with each ingress and egress port is a security zone identifier. Security zone identifiers can be stored in a table of zone identifiers (not shown) that is indexed by port identifier (id). Screening engine 240 compares the security zone identifier associated with the packet being processed (determined from the identification of the egress port from the MAC table using the destination MAC address in the header of the packet being processed) with the security zone identifier associated with the port on which the packet was received in the device. Based on the comparison, screening engine 240 can determine whether the packet is destined for another zone (i.e., constitutes intra-zone or inter-zone communication).

The screening of packets can be with or without the knowledge of the individual terminal units. Associated with security switch 200 is a user interface (not shown) and associated management tools (not shown) for constructing one or more security zones. In one implementation, the security zones are determined based on the destination MAC address included in the L2 header of the packet received. More specifically, each egress port can be assigned to a security zone and have an associated security zone identifier associated therewith.

Alternatively, the security zones can be created for plural users coupled to different ports of the security switch 200. For example, security switch 200 can be configured to include three ports, where terminal units associated with a first two of the ports are assigned to a first zone, while terminal units associated with the third port are assigned to a second zone. Other configurations are possible. Zone assignments and partitions are discussed in greater detail below. The user interface allows an administrator or user to configure the security switch 200. The security switch 200 can be configured to create plural security zones and associate one or more interfaces with each zone. Thereafter, policies can be established for inspecting or otherwise screening packets as they traverse the security switch 200.

Firewall device 208 includes plural engines for performing packet screening prior to routing packets through security switch 200. Firewall device 208 includes a firewall engine 270 and associated policies 271, authentication engine 272, encryption engine 274, decryption engine 276 and a firewall controller 278.

Firewall controller 278 extracts packets from second portion 217 of storage element 208. Firewall controller 278 oversees the distribution of packets within the firewall device as well as the coordination among the respective engines. Each packet is evaluated and processed in accordance with policies based on one or more considerations. For example, packets can be screened based on source, destination or both. One or more policies 271 are retrieved and used by firewall engine 270 to inspect the packet. Packet inspection may also require encryption, decryption and authentication services. One or more of the encryption 272, decryption 274 and authentication 276 engines can be invoked by the firewall controller 278 as part of the inspection processes. In addition, other services can be provided including virtual private network termination services, session set-up and various other traffic management and security related functions. Examples of screening services are discussed in greater detail below. After the inspection, packets can be forwarded in the network or dropped as appropriate. In one implementation, packets that are to be forwarded (e.g., pass the inspection) are prepared as appropriate (e.g., encrypted) then forwarded to the first portion 215 of storage element 208. Alternatively, the packets may be returned to the second portion 217 of storage element 208 and marked as having been screened. In one implementation, screened packets are forwarded to a queue for processing by L2 controller 230. Screened packets are then processed by L2 controller 230 and switched to an appropriate output port in accordance with conventional L2 processing protocols.

Figure 2B:
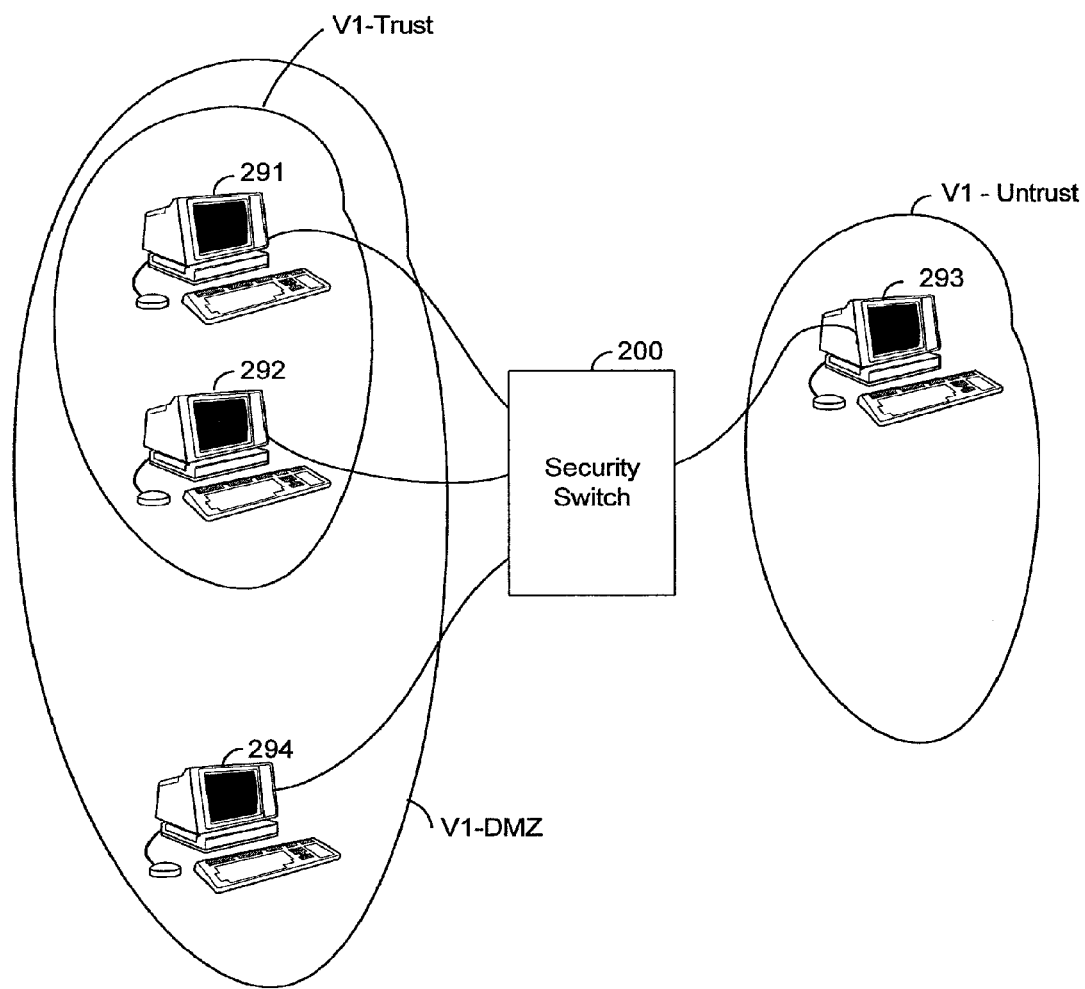
FIG. 2b shows an exemplary communication network including plural zones partitioned by a single security switch.

Each security switch 200 can be configured to create plural security zones. For example, a communications network having a security switch 200 is shown in FIG. 2b. The communications network is a VLAN structure that includes 3 zones. Security switch 200 includes a user interface and administrative control mechanisms for creating each of the security zones, specifying policies and other criteria for defining and managing each zone. The security zones enforced by the security switch 200 can be transparent to the end users. That is, the security zones can be established at the security switch 200 including the specification of all operating parameters associated with the security domain. Users in each zone may be unaware of the zone structure and may communicate with other users in a conventional manner. For example, a virtual private network can be created between users including encryption and decryption services without requiring the actual encryption and decryption support in the respective end users (e.g., encryption and decryption services can be provided in secure switches disposed between the two users).

Accordingly, a system administrator can create a virtual private network between a remote user in one security zone and another user in a second security zone where the individual users are unaware of the VPN services and are not required to include encryption or decryption services locally. In one implementation, the administrator provisioned VPN services are specified for remote users in a same zone.

Alternatively, the users may be aware of the security structure and include indicators (e.g., zone identifiers) in packets transferred to other users. Each user may define their own custom L2 zone and an inter-zone policy for their network security requirements. For example, security switch 200 shown in FIG. 2b embodies a VLAN that includes v1-trust, v1-untrust and v1-dmz zones. V1-trust defines a zone that includes two users including user 291 and user 292. V1-untrust defines a zone that includes a single user 293. V1-dmz defines a zone that includes three users, users 291, 292 and user 294. Separate policies can be enforced for communications between the three zones. For example, communications that are intra-zone between user 291 and user 292 will not require inspection, and as such are handled by security switch 200 in accordance with conventional L2 protocols. Communications from user 291 to user 293 will invoke an inspection process as defined by the security system architect (e.g., user 291 or 292 or an administrator for such) for communications between V1-trust and V1-untrust. Similarly, communications between user 294 and user 291 will invoke an inspection process (e.g., a potentially lesser screen) for communications between V1-dmz and V1-trust.

Multiple interfaces are allowed inside each zone. For intra-zone traffic, security switch 200 behaves like a tradition L2 bridge forwarding a given packet based on the destination MAC-address. In one implementation, no firewall protection mechanisms are applied for the intra-zone traffic.

For inter-zone traffic, standard firewall inspections (including policy inspection, TCP stateful inspection, etc. as described above) are performed for each incoming packet. In all cases, the egress interface is determined by the learned destination MAC address on the interface.

Packet Flow

Figure 3:
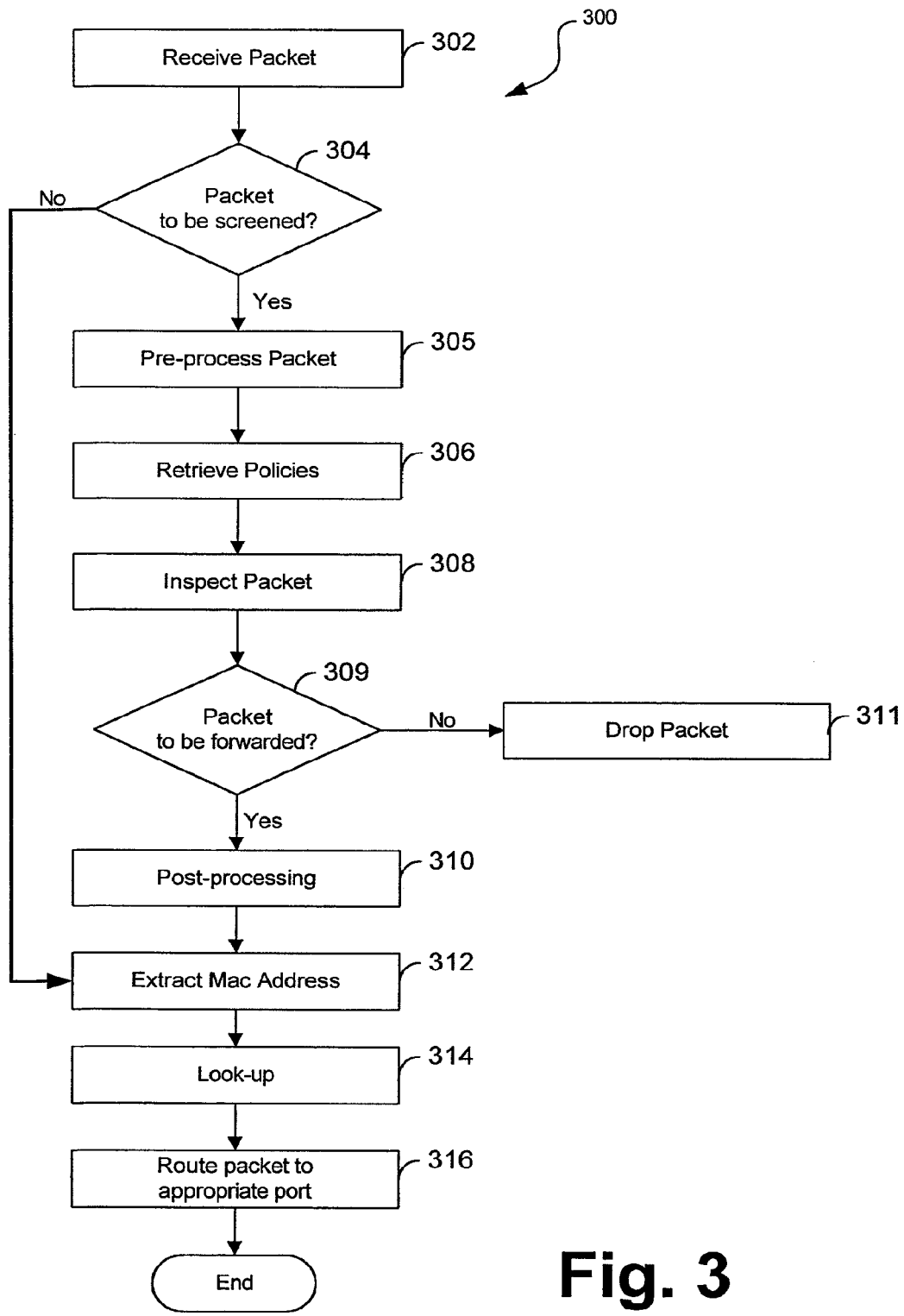

Referring now to FIG. 3, a method 300 is shown, as invoked by the security switch 200, for processing packets. The method described is made with no particular reference to the specific hardware elements performing the steps. An exemplary hardware configuration is given above. The method can however be implemented in L2 switches having other configurations. The method begins with the receipt of a packet (302). The packet is evaluated to determine whether the packet is to be inspected (304). If so, the packet is pre-processed as appropriate (305) and one or more policies are retrieved (306). The pre-processing of the packet can include decryption and authentication services. The retrieval of a policy includes the identification of the zone to which the packet is being transferred. Packets traveling between zones can be inspected using a security policy. Intra-zone communications may not be inspected. In one implementation, policies can be enforced on intra-zone communications. The retrieval of a policy includes a MAC look-up for the MAC destination address in a received packet in the MAC table to determine an egress port associated with the MAC address and necessarily a security zone. The security zones associated with the packet's ingress and egress ports are compared to determine if the packet is passing to another zone. Assuming that an inspection is to occur, an appropriate policy is retrieved (i.e., based on the ingress port and egress port identifiers and their respective security zones). Thereafter, the packet is inspected (308). Packet inspection can include screening and dropping the packet as required. If the packet is to be forwarded on the network (309), post-processing operations are invoked as appropriate (310). Alternatively, the packet is dropped (311). The post processing operations can include session set-up, encryption and other functions. Thereafter the packet is processed in accordance with conventional L2 protocols starting at step 312.

At step 312, either a packet has passed inspection or did not require inspection. In either case, L2 header information is extracted to determine a MAC address associated with the packet. A look-up of the MAC address is performed (314) and the packet is then routed to an appropriate output port (316). Thereafter the process ends.

Referring again to FIG. 2, the process steps are described with reference to one hardware implementation of the invention. Packets are received at a port 202. Each packet is transferred on bus 205 to, and routed through, security controller 204 and stored in storage element 208 via a storage bus 209. Security controller 204 evaluates each packet to determine if inspection is required and forwards the packets to an appropriate portion of storage device 208. Packets that are not to be inspected (i.e., packets stored in first portion 215 of storage device 208) are processed by L2 controller 230. When L2 controller 230 is available, packets are fetched and processed to determine a port to which the packet should be forwarded. L2 controller 230 evaluates the MAC address associated with the packet, and using MAC table 235, determines a port for routing. After processing by the L2 controller 230, the packet is forwarded to an appropriate link into switch fabric 220 for routing to a determined output port 202.

Packets that are to be inspected are transferred by security controller 204 into second portion 217 of storage element 208. When firewall engine 230 is available, a packet is fetched and processed to determine a security policy to be used in inspecting the packet. Firewall engine 270 evaluates IP address(es) associated with the packet and implements traffic control and management functions as appropriate. Packets that are to be forwarded (i.e., pass inspection) are returned to storage element 208. Thereafter, the packet can be forwarded to an appropriate link into switch fabric 220 for routing to a determined output port 202. Other packets are dropped or otherwise handled in accordance with the policies defined for the given security zones.

As discussed above, all packets that pass the inspection in the firewall device 210 as well as all packets that are not required to be inspected, are processed by L2 controller 230 in accordance with conventional L2 protocols. In one implementation, the processing of packets by L2 controller is modified to maintain security zones. More specifically, as discussed above, conventional L2 switches broadcast on all ports a packet that has a MAC address that is not recognized. This type of broadcast may well violate one or more security policies in place for given zones in the communication network. Accordingly, in one implementation a test packet is broadcast to each port. The broadcasting of test packets is described in more detail in association with FIG. 4.

Figure 4:
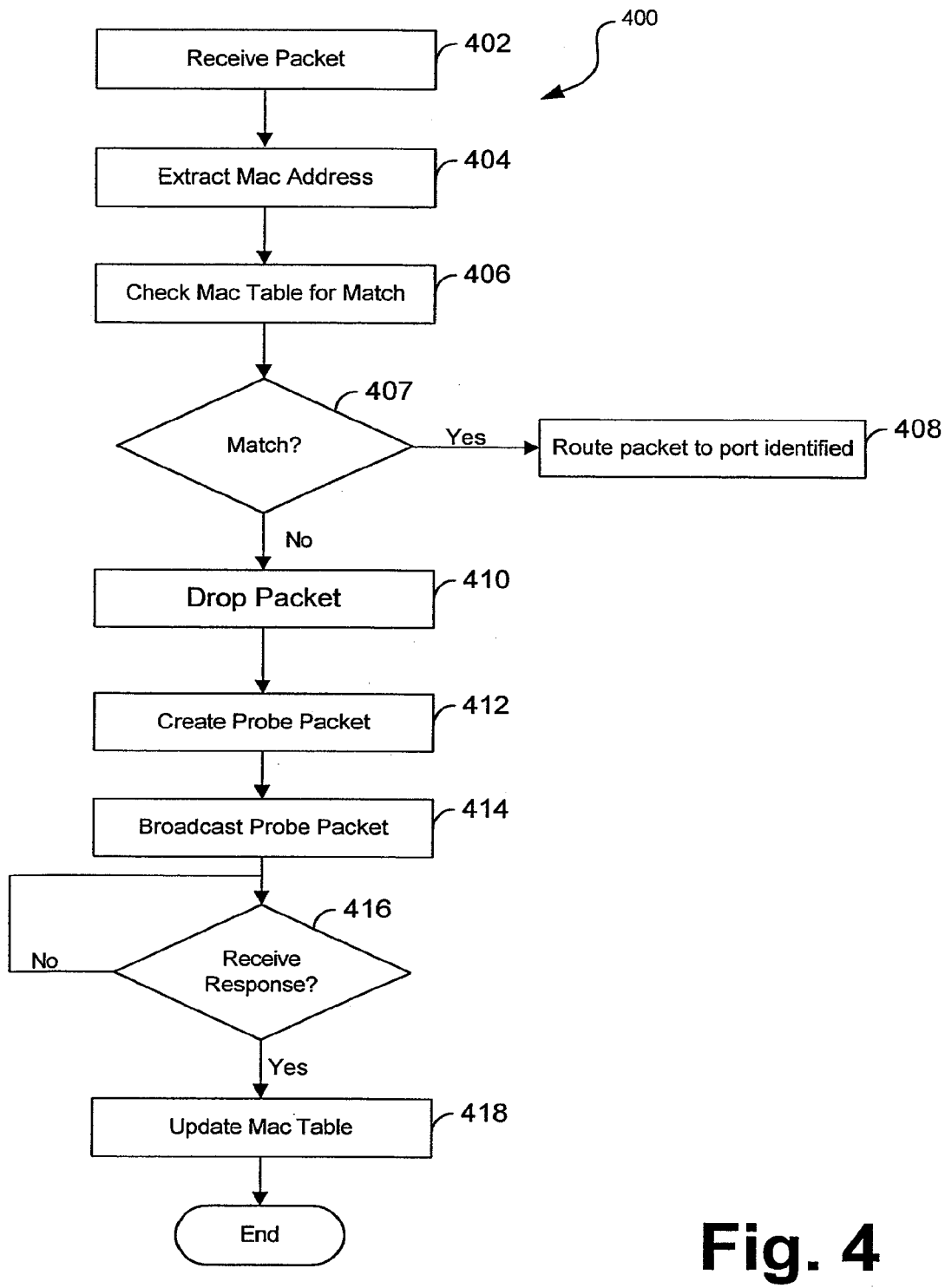

Referring now to FIG. 4, a method 400 is shown for handling packets by the L2 controller and includes receiving a packet to be processed (402). The MAC address for the packet is extracted (404). A check is made to locate an entry in a MAC address table that corresponds to the extracted MAC address (406). If a match is located (407), the packet is routed to an output port associated with the matching entry (408). If no match is located, the packet is dropped (410). In one implementation, the packet is merely held for a predetermined amount of time in hope of receiving information regarding the non-matching MAC address. If no match is located, a probe packet is created (412). The probe packet includes the MAC address associated with the packet being processed (i.e., the original ingress packet). In one implementation, the probe packet is an "ICMP PING" packet with an IP TTL field set to 1. Each packet includes the same MAC addresses (L2) and source/destination IPs (L3) as the ingress packet whose MAC address could not be located. The probe packet is then broadcast to all ports (414). A check is made to determine if a response is received on any of the security device's ports (416). The ICMP PING packet will cause the right gateway, which was to receive and forward the original ingress packet, to respond to the L2 controller in the device with an "ICMP TTL expired" message packet. From the expired packet, the system can identify the proper egress port/zone associated with the received MAC address. This method guarantees that no information in the original ingress packet will be leaked out. If a response is received (indicating that a device coupled to the receiving port is configured to process packets having the identified MAC address), then the MAC table is updated to include an entry having the MAC address and a port identifier indicating the port on which the response was received (418). Thereafter the process ends.

A number of embodiments of the invention have been described. Nevertheless, it will be understood that various modifications may be made without departing from the spirit and scope of the invention. For example, the firewall device has been described in terms of screening at the L3 layer level. Alternatively, other screening can be invoked at other levels including layers up to and including layer 7 (L7) processing. Accordingly, other embodiments are within the scope of the following claims.

What is claimed is:

1. A method comprising:
determining, by a network device, whether an entry, corresponding to a destination address included in a first packet, is stored in a memory associated with the network device;
transmitting, by the network device, a second packet, that includes the destination address, to one or more ports of a plurality of ports of the network device, when the entry is not stored in the memory,
the second packet being different than the first packet;
preventing, by the network device, the first packet from being transmitted until a response, to the transmitted second packet, is received via a particular port of the one or more ports that is associated with the destination address; and
transmitting, by the network device, the first packet after the response is received.

2. The method of claim 1, further comprising:
receiving the response via the particular port;
updating the memory to include the entry corresponding to the destination address based on receiving the response; and
including, in the entry, the destination address and information identifying the particular port.

3. The method of claim 1, further comprising:
obtaining the destination address from the first packet,
where the response indicates that a device, connected via the particular port, is to process packets associated with the destination address.

4. The method of claim 1, further comprising:
determining that the entry, corresponding to the destination address, is not stored in the memory associated with the network device; and
creating the second packet based on determining that the entry is not stored in the memory.

5. The method of claim 1, further comprising:
  determining that the entry is stored in the memory associated with the network device,
    the entry identifying a port of the plurality of ports of the network device; and
  transmitting the first packet to the port identified by the entry after determining that the entry is stored in the memory.

6. The method of claim 1, where preventing the first packet from being transmitted includes preventing the first packet from being transmitted for a particular period of time,
  the method further comprising:
    dropping, after the particular period of time, the first packet if the response is not received.

7. The method of claim 1, further comprising:
  determining whether the first packet is to be inspected; and
  determining whether the entry is stored in the memory based on determining whether the first packet is to be inspected.

8. A system comprising:
  a device configured to:
    receive a first packet that includes a destination address;
    determine whether an entry, corresponding to the destination address, is stored in a memory associated with the device;
    transmit a second packet, that includes the destination address, to one or more ports of a plurality of ports of the device when the entry is not stored in the memory, the second packet being different than the first packet;
    prevent the first packet from being transmitted until a response, to the transmitted second packet, is received;
    receive the response, to the transmitted second packet, from a particular port of the one or more ports,
      the particular port being associated with the destination address; and
    update the memory to include the entry based on receiving the response from the particular port.

9. The system of claim 8, where the device is further to:
  transmit the first packet via the particular port after receiving the response.

10. The system of claim 8, where, when updating the memory to include the entry, the device is to include the destination address and information identifying the particular port in the entry.

11. The system of claim 8, where the device is further to:
  determine whether the first packet is to be inspected; and
  determine whether the entry is stored in the memory based on determining whether the first packet is to be inspected.

12. The system of claim 8, where the device is further to:
  receive the first packet via a port of the plurality of ports;
  determine that the first packet is to be inspected;
  retrieve a security policy based on the port of the plurality of ports;
  process the first packet based on the security policy; and
  determine whether the entry is stored in the memory based on processing the first packet based on the security policy.

13. The system of claim 8, where the response indicates that a particular device, connected via the particular port, is to process packets associated with the destination address.

14. The system of claim 8, where the device is further to:
  determine that the entry is not stored in the memory associated with the device; and
  create the second packet based on determining that the entry is not stored in the memory.

15. The system of claim 8, where, when preventing the first packet from being transmitted, the device is to:
  prevent the first packet from being transmitted for a particular amount of time.

16. A non-transitory computer-readable medium storing instructions, the instructions comprising:
  one or more instructions which, when executed by a device, cause the device to determine whether an entry, corresponding to a destination address included in a first packet, is stored in a memory associated with the device;
  one or more instructions which, when executed by the device, cause the device to transmit a second packet, that includes the destination address, to one or more ports of a plurality of ports of the device, when the entry is not stored in the memory,
    the second packet being different than the first packet;
  one or more instructions which, when executed by the device, cause the device to determine whether a response, to the transmitted second packet, is received from a particular port of the one or more ports,
    the particular port being associated with the destination address;
  one or more instructions which, when executed by the device, cause the device to prevent the first packet from being transmitted until the response is received from the particular port; and
  one or more instructions which, when executed by the device, cause the device to transmit the first packet only after the response is received from the particular port.

17. The non-transitory computer-readable medium of claim 16, the instructions further comprising:
  one or more instructions which, when executed by the device, cause the device to receive the response via the particular port,
    where the response indicates that a particular device, connected via the particular port, is to process packets associated with the destination address; and
  one or more instructions which, when executed by the device, cause the device to update the memory to include the entry based on receiving the response from the particular port.

18. The non-transitory computer-readable medium of claim 16, the instructions further comprising:
  one or more instructions which, when executed by the device, cause the device to determine that the response is not received within a particular amount of time; and
  one or more instructions which, when executed by the device, cause the device to drop the first packet based on determining that the response is not received within the particular amount of time.

19. The non-transitory computer-readable medium of claim 16, the instructions further comprising:
  one or more instructions which, when executed by the device, cause the device to receive the first packet at a first port, of the plurality of ports, corresponding to a first security zone; and
  one or more instructions which, when executed by the device, cause the device to prevent transfer of the first packet to a second port, of the plurality of ports, corresponding to a second security zone that differs from the first security zone.

20. The non-transitory computer-readable medium of claim 16, where the one or more instructions to transmit the first packet include:

one or more instructions which, when executed by the device, cause the device to transmit the first packet via the particular port.

* * * * *